(12) United States Patent
Carstens et al.

(10) Patent No.: US 6,562,308 B1
(45) Date of Patent: May 13, 2003

(54) PROCESS FOR THE RECOVERY OF PHOSPHATE FROM PHOSPHATE ROCK

(75) Inventors: Leslie L. Carstens, Thorhild (CA); Nick P. Wynnyk, Edmonton (CA)

(73) Assignee: Agrium, Inc. (CA)

( * ) Notice: Subject to any disclaimer, the term of this patent is extended or adjusted under 35 U.S.C. 154(b) by 69 days.

(21) Appl. No.: 09/713,182

(22) Filed: Nov. 15, 2000

(51) Int. Cl.$^7$ .............................................. C01B 25/32
(52) U.S. Cl. ................................ 423/157.3; 423/157.4
(58) Field of Search ........................... 423/157.3, 157.4

(56) References Cited

U.S. PATENT DOCUMENTS

| | | | |
|---|---|---|---|
| 1,836,672 A | * 12/1931 | Larsson | 423/157.3 |
| 1,856,187 A | * 5/1932 | Johnson | 423/157.3 |
| 1,916,431 A | * 7/1933 | Larsson | 423/157.3 |
| 2,709,649 A | 5/1955 | Le Baron | 71/40 |
| 2,890,936 A | 6/1959 | Benefield | 23/165 |
| 3,556,724 A | * 1/1971 | Fuchs et al. | 423/157.3 |
| 3,647,361 A | 3/1972 | Coltrinari et al. | 23/18 |
| 3,919,395 A | 11/1975 | Hauge | 423/309 |
| 4,039,624 A | 8/1977 | Hill | 423/319 |
| 4,044,107 A | * 8/1977 | Houghtaling | 423/320 |
| 4,088,738 A | * 5/1978 | Hauge | 423/319 |
| 4,154,799 A | * 5/1979 | Hauge | 423/308 |
| 4,181,703 A | * 1/1980 | Wengeler et al. | 423/157.3 |
| 4,231,780 A | 11/1980 | Collins | 71/40 |
| 4,364,912 A | 12/1982 | Hill | 423/321 R |
| 4,609,535 A | 9/1986 | Thomas | 423/167 |
| 4,615,869 A | * 10/1986 | Kremer et al. | 423/157.3 |
| 4,828,811 A | 5/1989 | Derdall et al. | 423/319 |
| 5,011,665 A | 4/1991 | Cailly et al. | 423/21.5 |
| 5,093,088 A | 3/1992 | Derdall et al. | 422/189 |
| 5,211,735 A | 5/1993 | Costa et al. | 71/40 |
| 5,362,460 A | * 11/1994 | Laird et al. | 423/157.4 |

FOREIGN PATENT DOCUMENTS

| | | |
|---|---|---|
| DE | 50 043 | 10/1966 |
| EP | 0 200 073 A2 | 12/1986 |
| FR | 1 439 339 | 5/1966 |

OTHER PUBLICATIONS

Unido, et al., "Fertilizer Manual", *Kluwer Academic Publishers, Dordrecht, The Netherlands*, 1998, 311–331 & 385–395, XP–002203601. (no month).
Rasulov, M.M. et al., "Particle size of lumpy Karatau phosphorites and filtering properties of the insoluble residue from the decomposition in nitric acid", *Chemical Abstracts*, 1982, 96(22), 152, XP002203602. (no month).
Rasulov, M.M. et al., "Complex Fertilizer", *Chemical Abstracts*, 1982, 97(15), 621, XP002203603. (no month).
Kodama, K. "Wet Process Phosphoric Acid", *Chemical Abstracts*, 1981, 95(26), 139, XP–002203604. (no month).
Becker, P., "Phosphates and Phosphoric Acid", *Fert. Sc. And Tech. Series*, Marcel Dekker, Inc., N.Y.(1983), pp. 369–404. (no month).
Becker, P., "Phosphates and Phosphoric Acid", *Fert. Sc. And Tech. Series*, Marcel Dekker, Inc., N.Y. (1983), pp. 195–279. (no month).
Forssberg, Eric and Adolfssen, Goran, "Dephosphorization of High Phosphorus Iron Ores by Acid Leaching", *Ermetall*, (1981), 34(6), pp. 316–322. (no month).
Gilbert, Richard L. and Moreno, Edgar C., "Dissolution of Phosphate Rock by Mixtures of Sulphuric and Phosphoric Acid", *I&EC Process Design and Development*, (1965), 4(4), pp. 368–371. (no month).
Slack, A.V., "Phosphoric Acid", *Fert. Sc. And Tech. Series*, Marcel Dekker, Inc. NY (1968), 1, pp. 253–258. (no month).

* cited by examiner

*Primary Examiner*—Wayne A. Langel
(74) *Attorney, Agent, or Firm*—Woodcock Washburn LLP

(57) ABSTRACT

There is disclosed a wet process for the recovery of phosphate from phosphate rock which comprises leaching finely divided particles of phosphate rock with a protic acid at a temperature and for a time that favours dissolution, into a leachate, of the phosphate in relation to an impurity, and, isolating the leachate. An appropriate combination of particle size, leach time and leach temperature can achieve high phosphate recovery while reducing the amount of impurities.

62 Claims, 9 Drawing Sheets

PROCESS FOR THE RECOVERY OF PHOSPHATE FROM PHOSPHATE ROCK

FIELD OF THE INVENTION

The present invention relates to the area of ore processing, particularly to the wet processing of phosphate rock.

BACKGROUND OF THE INVENTION

One of the primary uses of phosphoric acid is in the production of artificial fertilizers. Phosphoric acid is made on an industrial scale by extracting phosphate (expressed as phosphorus pentoxide ($P_2O_5$)) from phosphate rock by acidulating the phosphate rock to form a solution of phosphoric acid. In the past, easily mined high-grade phosphate rock deposits provided phosphate without the need for complicated purification processes. With the depletion of such high-grade deposits, lower grade deposits must be employed. However, the presence of a larger amount of impurities, such as metals including iron, in the lower grade rock has necessitated the increased usage of processes for the purification (beneficiation) of the phosphate rock. Such beneficiation processes add to the cost of producing the phosphate and negatively affect the overall $P_2O_5$ recovery.

Purification of the phosphate rock is generally desirable in industry, such as in the fertilizer industry, since the absence of impurities means that there is more phosphate present per unit weight of the final acid product. Less of the product is then required leading to a decrease in the cost of transporting it. Furthermore, a higher-grade product leads to a decrease in the amount of handling and reduces the amount of sludge produced during processing. Finally, higher-grade phosphate rock reduces scaling concerns faced by processors.

Fertilizers, for example, may be produced from phosphate solutions by concentrating the phosphoric acid solution obtained from the acidulation of phosphate rock followed by reaction of the solution with anhydrous ammonia to form monoammonium phosphate (MAP) as a wet solid. MAP is then granulated and dried to yield dried granules of fertilizer. Concentration of the phosphoric acid solution may be accomplished by such methods as vacuum evaporation and submerged-combustion direct heating. Superphosphate fertilizers such as normal superphosphate (NSP) and triple superphosphate (TSP) may also be produced from phosphoric acid solutions. For a review of fertilizer production, see *Fertilizer Manual*, T. P. Hignett ed., (International Fertilizer Development Center, Muscle Shoals, Ala., USA (1985)) pp. 187–202.

The wet processing of phosphate rock generally involves the reaction of ground phosphate rock with an acid such as sulphuric acid or mixtures of different acids. The reactant solution used in such a process is often based on a recycled acid solution already containing phosphoric acid to which more sulphuric or other acid is added. Phosphate dissolves in the acid solution and is present in solution in the form of phosphoric acid. The solution can be isolated from the residue by a variety of methods including filtration, centrifugation and froth flotation. The following reference provides a discussion of the wet process technique: Becker, P., "Phosphates and Phosphoric Acid", *Fert. Sc. and Tech. Series*, (Marcel Dekker, Inc., N.Y. (1983)) pp. 369–403.

Wet processing has disadvantages. The residue may be slime rather than a crystalline solid making the isolation of the solution more difficult. This can be ameliorated by digesting the phosphate rock for a longer period of time, as in the Prayon process (Slack, A. V., "Phosphoric Acid", Vol. 1, *Fert. Sc. and Tech. Series*, (Marcel Dekker, Inc., N.Y. (1968) pp. 253–258) thus promoting the growth of larger insoluble solid residue particles, generally gypsum (calcium sulphate) formed from the calcium in the phosphate rock and the sulphate from sulphuric acid. While larger residue particles may be formed in this manner, the longer digestion time results in more of the impurities solubilizing, thus contaminating the product phosphoric acid. The temperature and time of reaction in the Prayon process are responsible for the unwanted solubilization of impurities. Therefore, there is a need for a process that favours the dissolution (and therefore recovery) of phosphate while reducing the amount of impurities recovered with the phosphate and favouring the formation of easily separable residue.

U.S. Pat. No. 4,039,624 issued on Aug. 2, 1977 to Hill, discloses a process for producing phosphoric acid from high iron and aluminum content phosphate rocks using nitric acid. This process employs relatively coarse particles of phosphate rock (~0.5 mm) and the leach time is very long (~1 hours). Furthermore, this process requires the presence of high levels of iron and aluminum and requires iron in a non-hydrated form (e.g. hematite). There still remains a need for a process that can be generally applied to phosphate rock containing different impurities and that requires less time to effect good separation of the phosphate from the impurities.

U.S. Pat. No. 3,919,395 issued on Nov. 11, 1975 to Hauge discloses a process for extraction of phosphorus compounds from low and high grade phosphate ore using dilute mineral acids whose calcium salts are water soluble. This process employs coarsely ground ore (larger than 100 mesh (150 microns) and requires a neutralization step using ammonia or lime.

In another process, high iron containing phosphate rock is leached with nitric or hydrochloric acid to form a solution of phosphoric acid and a concentrate containing the iron (Forssberg, Eric and Adolfsson, Goran, "Dephosphorization of High Phosphorus Iron Ores by Acid Leaching ", *Erzmetall*. 34(6): 316–322 (1981)). This process is focussed on the recovery of iron rather than phosphorus. The process uses relatively coarse particle sizes (in ranges from 75 to 6700 microns) and leaching occurs over a long period of time (~24 hours). The paper states that sulphuric acid is unsuitable in the process because the formation of calcium sulphate in the concentrate lowers the Fe-content from 61 to 56%. This means that a significant amount of iron is being leached into the acid solution along with phosphate.

U.S. Pat. No. 4,828,811 issued on May 9, 1989 to Derdall et al discloses a process and apparatus for producing phosphoric acid from phosphate ore wherein a slurry of phosphate ore in phosphoric acid is processed in a multi-zone reactor in which coarse solids and "fine" solids are processed separately. This patent refers to "fine" solids which are typically about—65 mesh (>150 microns).

The effect of particle size on the dissolution of phosphate rock by mixtures of sulphuric acid and phosphoric acid has been studied (Gilbert, Richard L. and Moreno, Edgar C. "Dissolution of Phosphate Rock by Mixtures of Sulfuric and Phosphoric Acids", *I&EC Process Design and Development*, 4(4): 368–371 (Oct., 1965)). While this study generally shows that reducing phosphate rock to smaller particle sizes favours the dissolution of phosphate, there is no teaching of favourable separation of impurities present in the phosphate rock. There is no indication in this reference that reducing the particle size not only increases the solubilization of phosphate but also selectively increases the solubilization of phosphate in relation to an impurity.

SUMMARY OF THE INVENTION

There is provided a process for recovering phosphate from phosphate rock comprising:

(a) leaching finely divided particles of phosphate rock with a protic acid at a temperature and for a time that favours dissolution, into a leachate, of phosphate in relation to an impurity; and, (b) isolating the leachate.

There is also provided a process for separating phosphate from an impurity in phosphate rock comprising leaching finely divided particles of phosphate rock with a protic acid at a temperature and for a time that favours retention of the impurity in a solid residue in relation to retention of the phosphate in the solid residue.

DESCRIPTION OF THE PREFERRED EMBODIMENT

Phosphate rock includes all naturally occurring mineral deposits containing phosphate as a component. Phosphate deposits can encompass variations and differing compositions within the same source and can have a variety of geological structures and a complex mineral make-up. Apatite and fluorapatite are two variations that may be encountered. Metal ores, such as iron ore, that contain phosphate are also encompassed by the term "phosphate rock".

Phosphate rock includes a number of other constituent elements or impurities that are, ideally, removed or reduced in the recovery of phosphate from phosphate rock. Such impurities include, but are not limited to, main group metals (such as germanium and gallium) and metalloids (such as aluminum and silicon), transition metals (such as iron and vanadium), lanthanide metals, actinide metals, alkali metals (such as sodium) and alkaline earth metals (such as calcium and magnesium). The process of this invention is particularly, but not exclusively, useful for reducing the amount of iron recovered with the phosphate.

Impurities can be present in phosphate rock in a variety of amounts. In the case of iron, high iron content is typically considered to be greater than about 1% by weight based on the total weight of the phosphate rock, and iron contents greater than 5%, greater than 20%, or even greater than 25% are known. The process is particularly suitable for phosphate rock having high iron content since the residue formed is more easily separated because the calcium sulphate particles, to which the iron impurities report, form as large clusters lending themselves to separation by filtration. More costly and complicated separation techniques such as froth flotation and magnetic beneficiation are not required when the residue is formed of large solid particles thus providing economic benefits in the savings of both time and energy. Additionally, the reduced level of impurities results in a better product.

Furthermore, unlike previously discussed U.S. Pat. No. 4,039,624, the present invention works well on both hydrated and non-hydrated forms of iron. It has also been found that satisfactory iron/phosphate separation is achievable by using the present invention on certain mineral forms of iron (e.g. goethite and hematite) that have low magnetic susceptibility for magnetic separation techniques. Conversely, the Prayon process, with its higher temperature and longer reaction time, solubilizes these forms of iron.

In a process of the present invention, a leachate is obtained in which the impurity to phosphorus ratio is markedly smaller than the original impurity to phosphorus ratio found in the phosphate rock. Conversely, the ratio of impurity to phosphorus in the solid residue after leaching is increased in relation to the original rock.

Finely divided phosphate rock provides particularly favourable recovery of phosphate while reducing the amount of impurities recovered with the phosphate. Typically, finely divided particles having a diameter of less than about 200 microns are useful. Particles having diameters of 150 microns or less (−100 Tyler mesh) are preferred. More particularly, particles having a diameter of less than about 75 microns, preferably less than about 60 microns, more preferably less than about 50 microns, yet more preferably less than about 40 microns and even more preferably less than about 38 microns (−400 Tyler mesh) are useful in the process.

Reducing the size of phosphate rock to an appropriate particle size can be done by any convenient method and is generally done prior to leaching the rock with acid. There are a number of well-known prior art methods including grinding and crushing. A variety of such methods are described in Becker, P. "Phosphates and Phosphoric Acid", *Fert. Sc. and Tech. Series*, (Marcel Dekker, Inc., N.Y. (1983) pp. 195–275). Rod or ball mills, with air classification, are particularly suitable for grinding the phosphate rock for the present invention.

Protic acids are any acids that contribute hydrogen ions (hydronium ions) in aqueous solution. Protic acids include mineral acids and organic acids. Mixtures of protic acids may also be used. Mineral acids or mixtures of mineral acids are preferred. Of the mineral acids, strong acids are preferred, strong acids being those acids that substantially completely dissociate in aqueous solution. Sulphuric acid ($H_2SO_4$) and nitric acid ($HNO_3$) are particularly useful with sulphuric acid being more particularly preferred.

Sulphuric acid is particularly preferred since the sulphate from the acid combines with calcium in the phosphate to form calcium sulphate (gypsum) which is insoluble in water and precipitates from solution carrying impurities, particularly iron, with it. Clusters of gypsum are formed which are very filterable. Such easily filterable gypsum particles are formed even when the phosphate rock is leached for a short period of time.

While sulphuric acid is particularly preferred, the use of nitric acid, for example, may also result in a residue that can be separated from the leachate. In the case of nitric acid, calcium nitrate would be formed which can be crystallized and filtered, for example.

The protic acid is preferably used in aqueous diluted form. The amount of sulphuric acid used is typically from about 0.5 to about 5.0 equivalents based on the amount of calcium oxide (CaO) in the phosphate rock. A more preferred range is from about 1.0 to about 3.0 equivalents with a range of about 1.0 to about 2.0 equivalents being yet more preferred and a range of about 1.0 to about 1.5 equivalents being still more preferred.

In the process, the phosphate rock is leached in the presence of the protic acid at a temperature and for a time that favours dissolution of the phosphate in relation to an impurity. It has been found that higher temperature increases the dissolution of both phosphate and iron but increases iron to a greater extent. Shorter time reduces the solubilization of both the phosphate and the iron but, as the leaching time is decreased, the most dramatic reduction in iron dissolution occurs before the occurrence of the most dramatic reduction in phosphate dissolution, particularly at a higher temperature.

It is apparent from these observations that the optimal temperature is a function of the leaching time, and viceversa. The following algorithms substantially and/or essentially express the relationship between temperature and time as a function of phosphate or iron solubility:

$$\% P = -7.025 \ln(T)\ln(t) + 30.796 \ln(t) + 44.325 \ln(T) - 97.914$$

$$\% Fe = 0.001(T)(t) - 0.029(t) + 0.083(T) - 1.321$$

wherein % P is the amount of phosphate solubilized expressed as a percentage of the total phosphate that was present in the phosphate rock originally, % Fe is the amount of iron solubilized expressed as a percentage of the total iron that was present in the phosphate rock originally, T is the temperature in degrees Celsius, and t is the leaching time in seconds. These relationships are particularly pertinent for temperatures from about 40° C. to about 70° C. and for leaching times from about 60 seconds (1 minute) to about 600 seconds (10 minutes). The percentage of iron not solubilized can then be expressed as:

$$\% Fe \text{ not solubilized} = 100 - \% Fe$$

The iron not solubilized would be present in the solid residue.

Generally, the temperature of the leaching step, when performed at atmospheric pressure, may be from about −15° C. to about 150° C., preferably from about 4° C. to about 80° C., more preferably from about 10° C. to about 70° C., even more preferably from about 20° C. to about 70° C., yet more preferably from about 40° C. to about 70° C. and even yet more preferably from about 60° C. to about 70° C. If the leaching step is done under pressure, such as in a pipe reactor, the temperature may even exceed 100° C. One skilled in the art will appreciate that the temperature ranges generally used in the process of this invention can be lower than those that are normally employed in the art, such as in the Prayon process. As has been discussed previously, the optimal temperature depends on the leaching time employed.

Generally, the time for the leaching step may be from about 1 second to about 24 hours, preferably from about 5 seconds to about 20 minutes, more preferably from about 30 seconds to about 10 minutes. Times from about 1 minute to about 5 minutes and from about 1 minute to about 3 minutes are particularly preferred in the invention. In embodiments of the invention where the leaching is done under pressure at high temperature, short leaching times on the order of several seconds may provide the good separation of phosphate and impurities that is obtainable from the process of the present invention.

In a particularly preferred embodiment, a process for recovering phosphate from phosphate rock comprises providing finely divided particles of phosphate rock having a diameter of less than about 40 microns, leaching the phosphate rock with sulphuric acid at a temperature from about 40° C. to about 70° C. for about 1 to about 5 minutes to favour dissolution, into a leachate, of phosphate in relation to an impurity, and, isolating the leachate.

The leaching step can be conducted in any convenient reaction vessel. Examples of such vessels include screw augers, ribbon blenders, paddle mixers and pipe reactors with static mixers that exit directly onto a filtration apparatus.

Once the leaching step is complete, the leachate containing the desirable phosphate must be isolated (separated) from the solid residue containing impurities. Any convenient method of isolation can be used. Well-known methods such as filtration and centrifugation can be used to isolate the leachate. Filtration, particularly vacuum filtration, is preferred since it is easier and more economical.

EXAMPLES

Example 1

Figure 1:
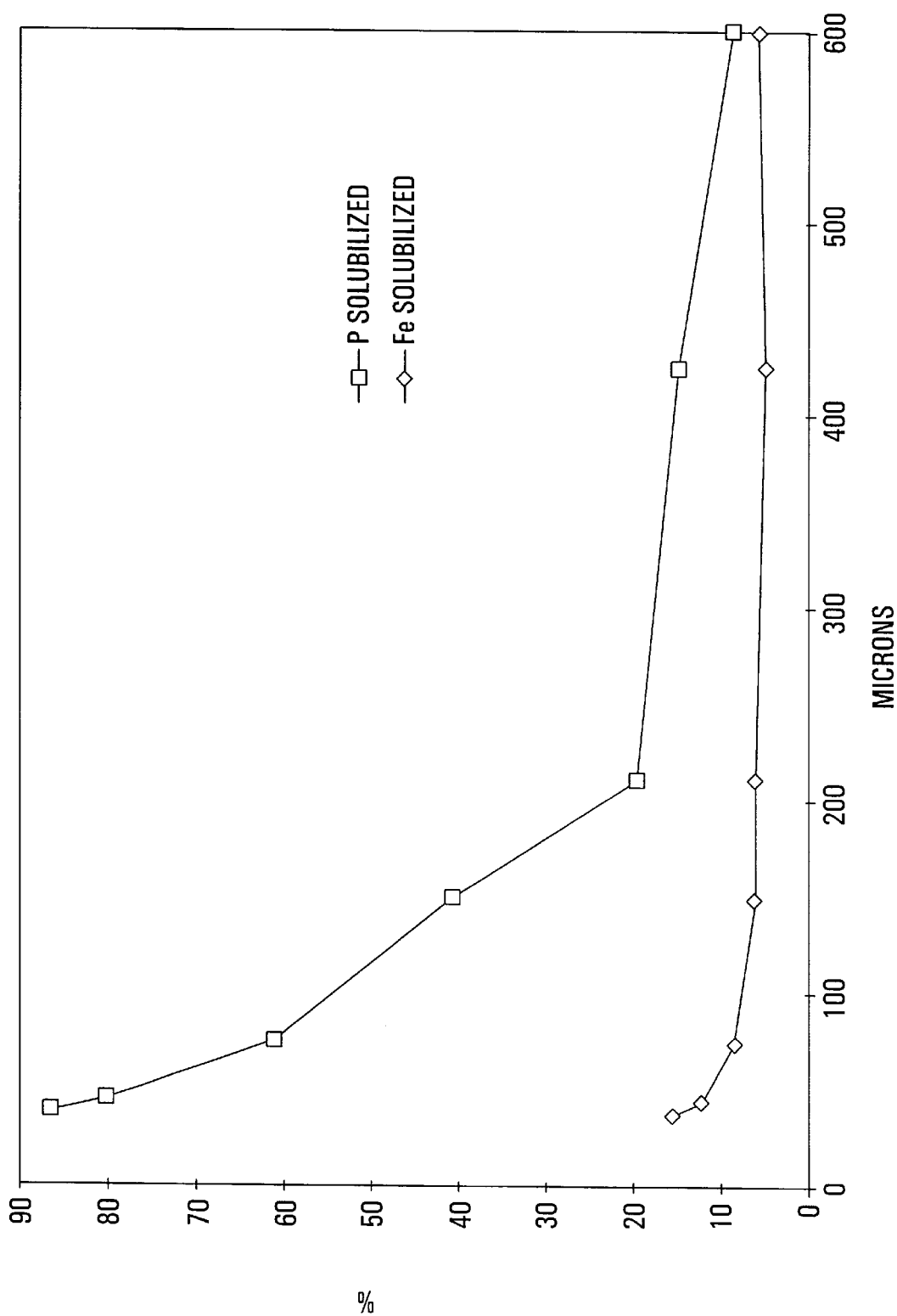
FIG. 1 is a graph depicting the percentage of phosphorus and iron solubilized as a function of phosphate rock particle size in leaching of phosphate rock.

Process for Recovering Phosphate from KAP Rock

This Example describes a bench scale phosphate recovery process in accordance with the invention. In the process, 100 grams of an aqueous leach solution containing 90 grams of recycled phosphoric acid (11.8% $P_2O_5$ and 0.58% $Fe_2O_3$) from a Phos Acid Plant and 10 grams of 98% sulphuric acid are preheated to 65 degrees Celsius. To this solution is added 4.9986 grams of phosphate concentrate (containing 11.3% $Fe_2O_3$ and 28.4% $P_2O_5$) that had been ground to a particle size of less than 38 microns. The phosphate concentrate used is obtained from a mining facility in Kapuskasing, Ontario, Canada and is therefore termed "KAP rock". The resulting mixture is stirred for exactly one minute and then quickly filtered by vacuum through a #54 Whatman™ filter paper in a Buchner funnel. The solid residue is washed twice with 50 ml each of distilled water. The solid residue is then dried at 50 degrees Celsius under vacuum, cooled and weighed. A portion of the solid residue is then analyzed for $Fe_2O_3$ and $P_2O_5$ by inductively coupled plasma (ICP) techniques and the amounts of $Fe_2O_3$ and $P_2O_5$ reporting to the solid residue are determined. The percentage of $Fe_2O_3$ and $P_2O_5$ reporting to the solid residue can then be calculated by dividing the amount of each in the solid residue by the amount of each in the rock and multiplying by 100%. The percentage of $Fe_2O_3$ and $P_2O_5$ not reporting to the solid residue is then calculated by subtracting the percentage of each reporting to the solid residue from 100%. The results are shown in Table 1.

TABLE 1

|  | Input | | | | Output | % not to |
|---|---|---|---|---|---|---|
|  | Recycle | Rock | $H_2SO_4$ | Wash $H_2O$ | Solids | solids |
| Mass, gms | 90 | 4.9986 | 10 | 92.1791 | 7.3417 |  |
| $P_2O_5$, % | 11.76 | 28.45 | 0.00 | 0.00 | 1.94 |  |
| $Fe_2O_3$, % | 0.58 | 11.32 | 0.00 | 0.00 | 6.83 |  |
| $P_2O_5$, gms | 10.58 | 1.42 | 0.00 | 0.00 | 0.14 | 90.1 |
| $Fe_2O_3$, gms | 0.52 | 0.57 | 0.00 | 0.00 | 0.50 | 12.3 |

Example 2

Process for Recovering Phosphate from KAP "B" Rock

The same procedure as in Example 1 is applied to Kapuskasing "B" grade phosphate rock with much higher iron content (3× higher). The results are shown in Table 2.

TABLE 2

|  | Input | | | | Output | % not to |
|---|---|---|---|---|---|---|
|  | Recycle | Rock | $H_2SO_4$ | Wash $H_2O$ | Solids | solids |
| Mass, gms | 90 | 2.4381 | 10 | 57.5029 | 2.201 |  |
| $P_2O_5$, % | 11.76 | 11.00 | 0.00 | 0.00 | 2.04 |  |
| $Fe_2O_3$, % | 0.58 | 33.43 | 0.00 | 0.00 | 33.71 |  |
| $P_2O_5$, gms | 10.58 | 0.27 | 0.00 | 0.00 | 0.04 | 85.2 |
| $Fe_2O_3$, gms | 0.52 | 0.81 | 0.00 | 0.00 | 0.74 | 8.6 |

As can be seen from Examples 1 and 2, the majority of the iron reports to the solid residue, while the majority of the phosphorus does not report to the solid residue and therefore reports to the leachate.

Example 3

The Effect of Particle Size on Phosphate and Iron Solubilization

A sample of B1 KAP rock of 425–600 micron (−28+35 Tyler mesh) is divided into seven portions and ground to just pass the following:

600 micron (no grinding)
425 micron
212 micron
150 micron
75 micron
45 micron
38 micron Each portion is then subjected to the process of the present invention. The conditions are as follows:

| Temperature | 70° C. |
|---|---|
| Time | 2 minutes |
| Liquid used | 3$^{rd}$ filtrate |
| Amount of liquid | 40 grams |
| Amount of $H_2SO_4$ | 7.5 grams |

After filtration, drying and weighing of the gypsum residue, the % P and % Fe solubilized in each is calculated. Fe content is analyzed using ICP techniques wherein the sample is prepared by digesting it using nitric acid/hydrochloric acid (Ewing, G. W. et al, *Analytical Instrumentation Handbook*, (Marcel Dekker Inc., N.Y., 1990, p. 118)). Phosphate is analyzed using the Quimociac method (AOAC Official Methods of Analysis, 15$^{th}$ Ed., 1990, Method #962.02).

FIG. 1 depicts the results of the tests. Phosphate solubility shows an exponential increase with decreasing particle size, while iron solubility is only slightly affected. Thus, high recovery of phosphate can be obtained, with proportionally less iron solubilized, by decreasing the phosphate rock particle size.

It is apparent from this example that finely divided particles of phosphate rock enhance the recovery of phosphate in relation to an impurity.

Example 4

The effect of Temperature and Time on Phosphate and Iron Solubilization

A series of tests following a procedure similar to the one outlined in Example 1 are done to determine the amount of phosphate and iron solubilized at various combinations of temperature and time. The following parameters are used in all of the tests:

| Amount of KAP rock | 6 grams |
|---|---|
| Particle size | <38 microns |
| Amount of liquid | 40 grams |
| Amount of $P_2O_5$ in the liquid | 1.4% |
| Amount of $H_2SO_4$ | 7.5 grams |

Figure 2A:
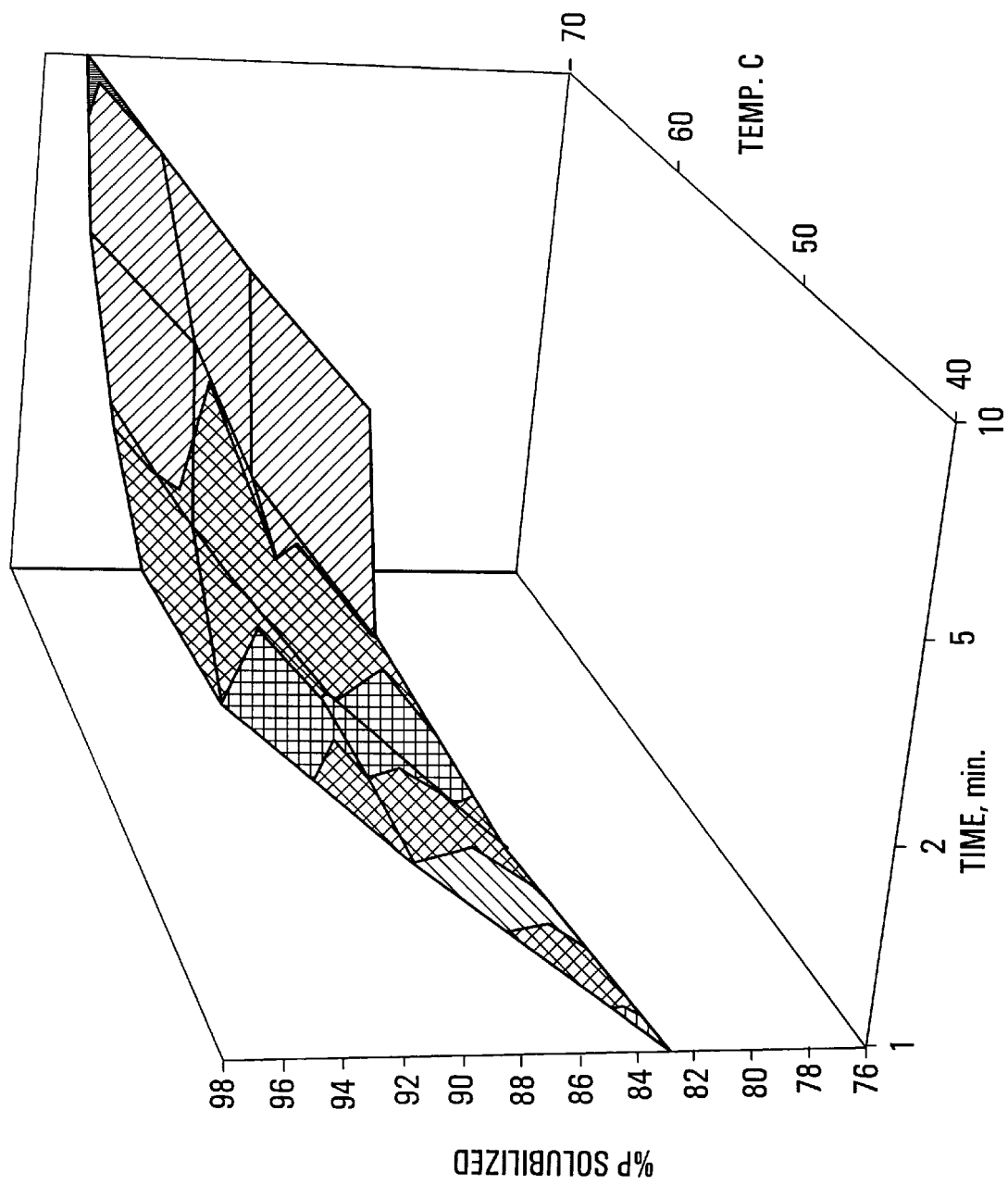
FIG. 2A is a graph depicting the percentage of phosphorus solubilized as a function of time and temperature in leaching of phosphate rock, ground to <38 micron.
Figure 2B:
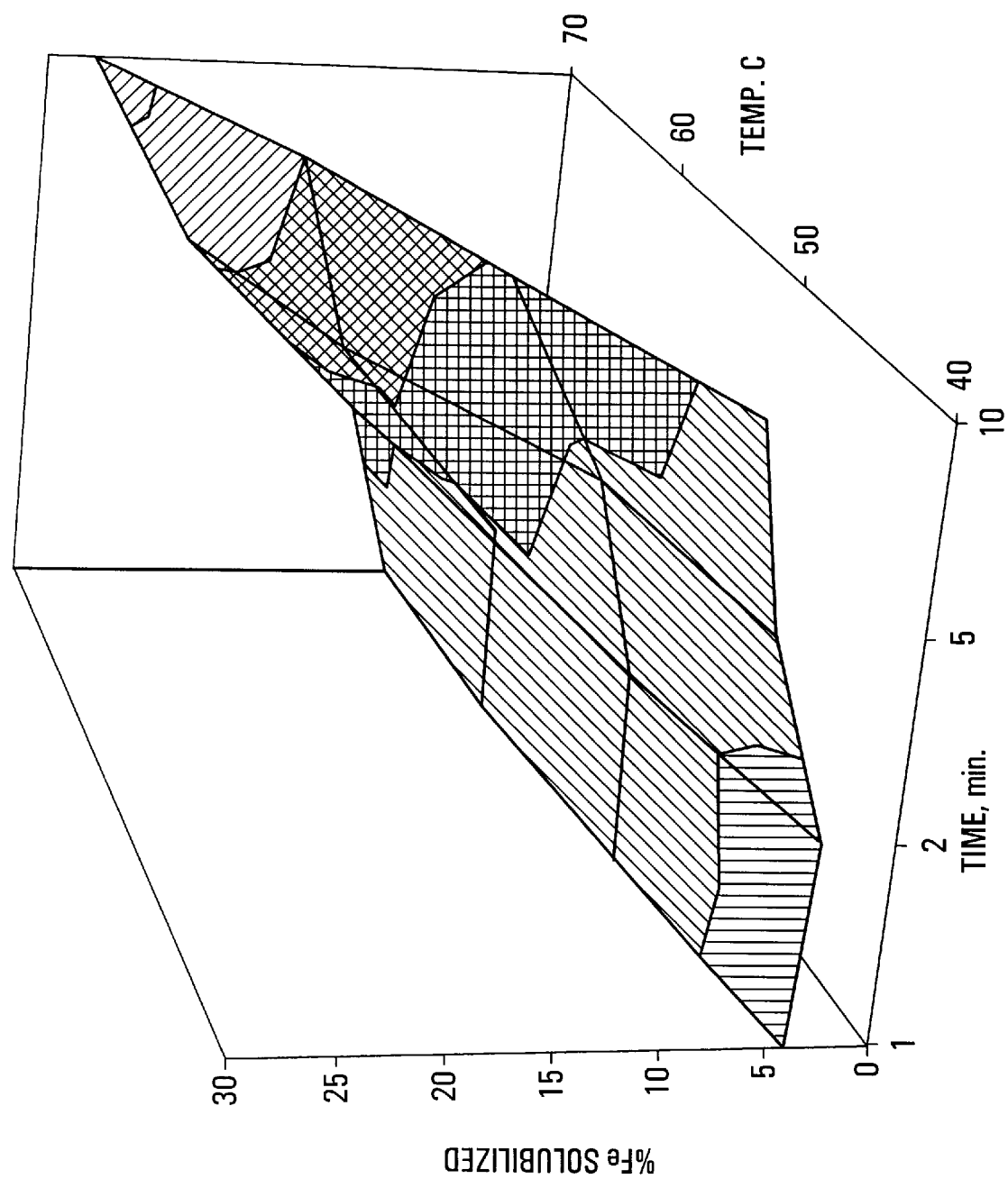
FIG. 2B is a graph depicting the percentage of iron solubilized as a function of time and temperature leaching of phosphate rock, ground to <38 micron.

The results are shown in Table 3 and FIGS. 2A and 2B.

TABLE 3

| Run # | Temp. (° C.) | Time (min) | % P sol. | % Fe sol. | Fe/P in leachate |
|---|---|---|---|---|---|
| 1 | 40 | 1 | 82.9 | 4.1 | 0.04 |
| 2 | 40 | 2 | 89.2 | 3.6 | 0.045 |
| 3 | 40 | 5 | 94.3 | 6.9 | 0.056 |
| 4 | 40 | 10 | 95.1 | 8.6 | 0.062 |
| 5 | 50 | 1 | 87.9 | 6 | 0.047 |
| 6 | 50 | 2 | 92.5 | 6.3 | 0.059 |
| 7 | 50 | 5 | 95.1 | 8.9 | 0.064 |
| 8 | 50 | 10 | 95.8 | 14.3 | 0.091 |
| 9 | 60 | 1 | 91.9 | 7.6 | 0.06 |
| 10 | 60 | 2 | 93.8 | 7.8 | 0.069 |
| 11 | 60 | 5 | 94.2 | 17 | 0.096 |
| 12 | 60 | 10 | 96 | 19.9 | 0.122 |
| 13 | 70 | 1 | 92.4 | 8.1 | 0.079 |
| 14 | 70 | 2 | 94.3 | 11 | 0.094 |
| 15 | 70 | 5 | 95.6 | 21.5 | 0.128 |
| 16 | 70 | 10 | 96.2 | 27.2 | 0.161 |

Table 3 and FIG. 2A show that the solubilization of phosphate is favoured at higher temperature and time. The level of solubilization of phosphate is relatively high through all the tested temperatures when the time is longer. The level of solubilization of phosphate is also relatively high through all the tested times when the temperature is higher.

Table 3 and FIG. 2B show that the solubilization of phosphate is favoured at higher temperature and time. The level of solubilization of iron is relatively low through all the tested temperatures when the time is shorter. The level of solubilization of iron is also relatively low through all the tested times when the temperature is lower.

These data show that the solubilization (recovery) of phosphate can be maximized in relation to the solubilization of iron by appropriate selection of temperature and time.

Example 5

Combined Effect of Particle Size, Temperature and Time on Phosphate and Iron Solubilization A series of tests following a procedure similar to the one outlined in Example 1 are done to determine the amount of phosphate and iron solubilized at various combinations of particle size, temperature and time. The phosphate rock used in these tests is a ground KAP concentrate containing 7.9% Fe (11.3% $Fe_2O_3$) and 28.4% $P_2O_5$. The KAP rock is screened to provide appropriate size fractions for the testing.

In all tests, 6 grams of rock and 40 grams of liquid (pondwater or recycle acid) are used. The following parameters are used:

|  | Lower | Higher |
|---|---|---|
| Particle size, μm | <38 | <75 |
| % $P_2O_5$ | 0.6% (pondwater) | 15% (recycle acid) |
| Sulphuric acid, gms | 5.0 | 10.0 |
| Temperature, °C. | 30 | 80 |
| Time, min. | 1 | 5 |

The lower level of sulphuric acid (5.0 grams) is stoichiometric to the CaO content of the rock while the higher level is 100% excess.

The full $2^5$ matrix of all combinations is run for a total of 32 tests. Fe content is analyzed using ICP techniques while phosphate is analyzed using the Quimociac method. The results are shown in Table 4.

The last column in Table 4 is the sum of the percentage P solubilized and the percentage Fe not solubilized. The test that gives the highest value of this sum is particularly interesting since it represents the situation where the most phosphate is recovered in relation to iron. Values over 180 are particularly favourable as this represents conditions in which phosphate recovery is 80–100% while iron removal is 80–100%. Test # 6 has the highest value, this value being 183.8.

The results in Table 4 show that a given particle size the order of importance for the remaining parameters in terms of phosphate solubilization is temperature (increases P solubility), time (increases P solubility), $P_2O_5$ concentration in the leach liquid (decreases P solubility) and sulphuric acid level (increases P solubility). In terms of iron solubilization, the order of importance is temperature (increases Fe solubility), time (increases Fe solubility) and $P_2O_5$ concentration in the leach liquid (increases Fe solubility).

TABLE 4

| Test # | Size μm | % $P_2O_5$ | $H_2SO_4$ gms | Temp °C. | Time min. | % Fe solubilized | % P solubilized | % Fe not solubilized | Sum of % P solubilized and % Fe not solubilized |
|---|---|---|---|---|---|---|---|---|---|
| 1 | 38 | 0.6 | 5 | 30 | 1 | 2.6 | 58.2 | 97.4 | 155.6 |
| 2 | 38 | 0.6 | 5 | 30 | 5 | 6.6 | 77.1 | 93.4 | 170.5 |
| 3 | 38 | 0.6 | 5 | 80 | 1 | 12.8 | 82.8 | 87.2 | 170 |
| 4 | 38 | 0.6 | 5 | 80 | 5 | 25.7 | 90.5 | 74.3 | 164.8 |
| 5 | 38 | 0.6 | 10 | 30 | 1 | 5.8 | 79.5 | 94.2 | 173.7 |
| 6 | 38 | 0.6 | 10 | 30 | 5 | 8.2 | 92 | 91.8 | 183.8 |
| 7 | 38 | 0.6 | 10 | 80 | 1 | 18 | 86.1 | 82 | 168.1 |
| 8 | 38 | 0.6 | 10 | 80 | 5 | 36.4 | 91.2 | 63.6 | 154.8 |
| 9 | 38 | 15 | 5 | 30 | 1 | 3.8 | 47 | 96.2 | 143.2 |
| 10 | 38 | 15 | 5 | 30 | 5 | 4.6 | 69.7 | 95.4 | 165.1 |
| 11 | 38 | 15 | 5 | 80 | 1 | 22.9 | 84.2 | 77.1 | 161.3 |
| 12 | 38 | 15 | 5 | 80 | 5 | 53.1 | 93.2 | 46.9 | 140.1 |
| 13 | 38 | 15 | 10 | 30 | 1 | 4.2 | 65.4 | 95.8 | 161.2 |
| 14 | 38 | 15 | 10 | 30 | 5 | 7.6 | 82.6 | 92.4 | 175 |
| 15 | 38 | 15 | 10 | 80 | 1 | 28.8 | 76.8 | 71.2 | 148 |
| 16 | 38 | 15 | 10 | 80 | 5 | 58.4 | 82.5 | 41.6 | 124.1 |
| 17 | 75 | 0.6 | 5 | 30 | 1 | 7 | 56.1 | 93 | 149.1 |
| 18 | 75 | 0.6 | 5 | 30 | 5 | 10.2 | 75.8 | 89.8 | 165.6 |
| 19 | 75 | 0.6 | 5 | 80 | 1 | 17.9 | 81.2 | 82.1 | 163.3 |
| 20 | 75 | 0.6 | 5 | 80 | 5 | 25.2 | 87.6 | 74.8 | 162.4 |
| 21 | 75 | 0.6 | 10 | 30 | 1 | 7.8 | 75.7 | 92.2 | 167.9 |
| 22 | 75 | 0.6 | 10 | 30 | 5 | 11.7 | 86.7 | 88.3 | 175 |
| 23 | 75 | 0.6 | 10 | 80 | 1 | 23.2 | 81.7 | 76.8 | 158.5 |
| 24 | 75 | 0.6 | 10 | 80 | 5 | 40.4 | 86.4 | 59.6 | 146 |
| 25 | 75 | 15 | 5 | 30 | 1 | 5.5 | 43.9 | 94.5 | 138.4 |
| 26 | 75 | 15 | 5 | 30 | 5 | 8.6 | 65.4 | 91.4 | 156.8 |
| 27 | 75 | 15 | 5 | 80 | 1 | 25.6 | 80.4 | 74.4 | 154.8 |
| 28 | 75 | 15 | 5 | 80 | 5 | 55.9 | 89.8 | 44.1 | 133.9 |
| 29 | 75 | 15 | 10 | 30 | 1 | 8.2 | 59.2 | 91.8 | 151 |
| 30 | 75 | 15 | 10 | 30 | 5 | 10.8 | 74.5 | 89.2 | 163.7 |
| 31 | 75 | 15 | 10 | 80 | 1 | 39.6 | 72.5 | 60.4 | 132.9 |
| 32 | 75 | 15 | 10 | 80 | 5 | 63 | 76.4 | 37 | 113.4 |

The following conclusions from this Example can be made:

Highest phosphate solubilization is found at the higher temperature and higher time, however, at the lower temperature, the effect of time was more important.

Lowest iron solubilization is found at the lower temperature and lower time, however, at the lower temperature, iron solubility is not greatly affected by time.

Higher $P_2O_5$ concentration in the leach liquid had more effect on lowering phosphate solubility than it did on lowering iron solubility.

Higher sulphuric acid level had more effect on increasing phosphate solubility than it did on increasing iron solubility at lower temperature.

Phosphate solubility and iron insolubility were best at lower particle size.

These conclusions are in accordance with the conclusions drawn from the experiment in Example 4 above.

Example 6

Effect of Pondwater on Post-leaching of Iron

To test the effect of pondwater on post-leaching of iron, a test is performed in which the residue from a recovery process similar to that described in Example 1 is leached with pondwater at room temperature for 68 hours. Results show that only 3.3% of the iron in the residue is solubilized. After 140 hours of leaching, no further iron is solubilized indicating that an equilibrium is reached. Interestingly, phosphate solubilized from the residue is eight times higher than the iron. Therefore, post pondwater leaching may reduce the iron removal efficiency by about 3% but post pondwater leaching would actually increase the efficiency of phosphate recovery.

Example 7

Use of the Process in Secondary Recovery of Phosphate from Tailings of a Primary Separation A series of tests following a procedure similar to the one outlined in Example 1 are done to determine the usefulness of the process as a secondary recovery process for phosphate from tailings arising from initial separation of phosphate rock. Samples from KAP waste streams of three separate primary separation processes are used as follows:

| | | |
|---|---|---|
| B1 HGMS tails | 27.7% $P_2O_5$ | 24.1% $Fe_2O_3$ |
| HGMS tails | 32.8% $P_2O_5$ | 13.3% $Fe_2O_3$ |
| B1 Ore Primary Cyclone O/F | 22.6% $P_2O_5$ | 31.1% $Fe_2O_3$ |

The percentages above are on a dry weight basis. HGMS is "high gradient magnetic separation" which is a separation technique utilizing magnetic fields to separate magnetic material such as iron from non-magnetic material such as phosphorus. The third sample is separated initially using cyclonic techniques. Both HGMS samples are coarser and therefore ground to <38 microns. The B1 Ore Primary Cyclone O/F is very fine and requires no grinding. The tests are conducted on unground HGMS tailings, ground HGMS tailings and unground B1 Ore Primary Cyclone O/F.

The leach process is performed under the following conditions:

| | |
|---|---|
| Temperature: | 70° C. |
| Time: | 2 minutes |
| Sulphuric acid | 50% excess |
| Liquid | 3rd filtrate from Phos Acid process |
| rock:liquid | 1:8 |

Table 5 shows the $Fe_2O_3/P_2O_5$ ratio before leaching and after leaching. It is evident from the data in Table 5 that the amount of iron in relation to the amount of phosphorus in the produced filtrate drops dramatically after leaching, particularly for the B1 Ore Primary Cyclone O/F.

TABLE 5

| | $Fe_2O_3/P_2O_5$ ratio | |
|---|---|---|
| | before leach | after leach |
| B1 HGMS tails | 0.87 | 0.14 |
| HGMS tails | 0.41 | 0.11 |
| B1 Ore Primary Cyclone O/F | 1.37 | 0.12 |

Figure 3:
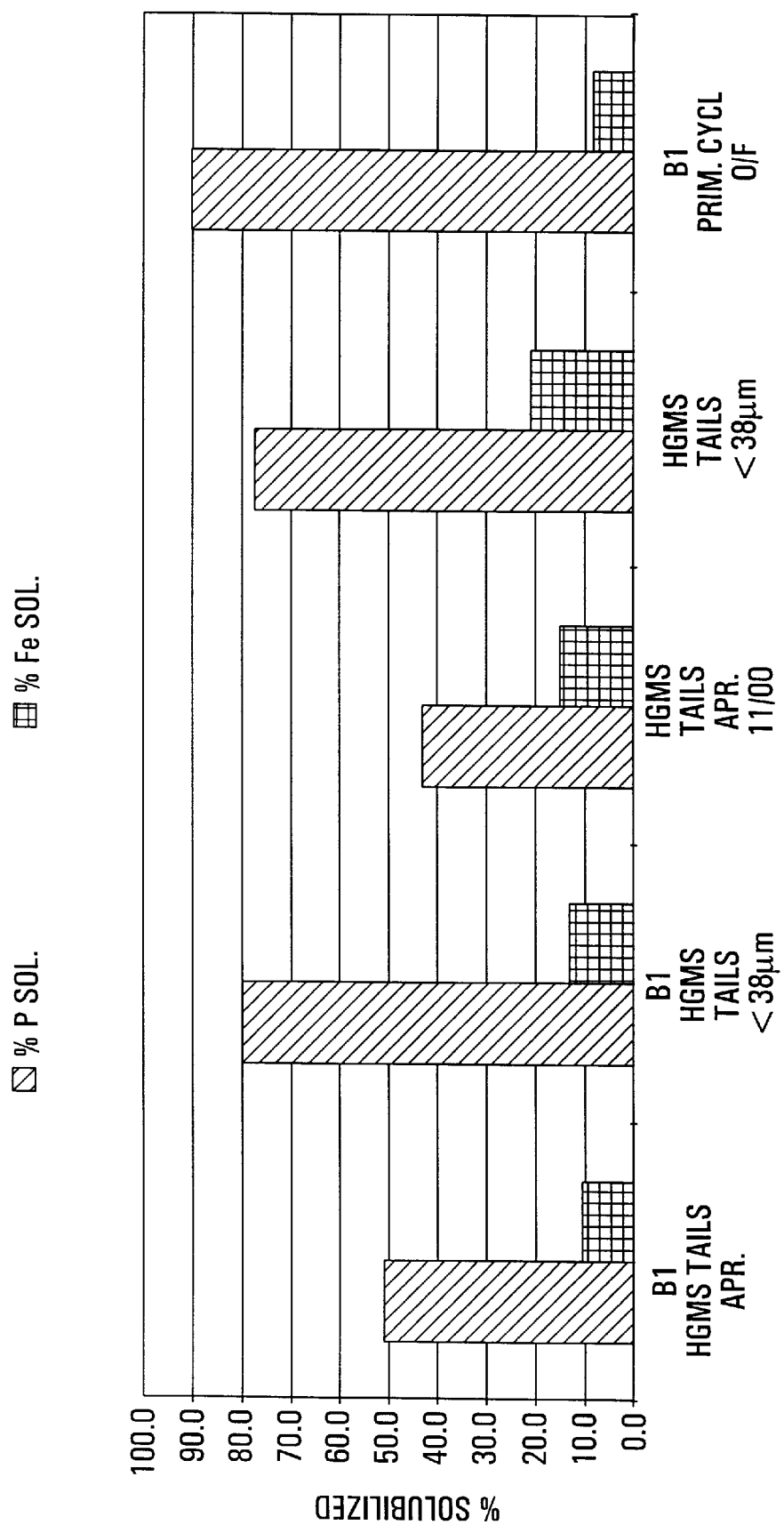
FIG. 3 is a graph depicting the percentage phosphate solubilized and the percentage iron solubilized in leaching of tailings obtained from an initial primary separation of phosphate rock.

FIG. 3 shows the percentage phosphorus and the percentage iron solubilized in the process in this Example. Results are shown for both ground and unground B1 HGMS and HGMS tails. Both of the unground HGMS samples had low $P_2O_5$ solubility due to the coarseness of the samples. For the ground HGMS samples $P_2O_5$ solubilities are on the order of about 80% while $Fe_2O_3$ solubilities are less than 20%. Further optimization of the HGMS samples may be possible by further grinding. For the B1 Ore Primary Cyclone O/F sample, $P_2O_5$ solubility is on the order of about 90% while $Fe_2O_3$ solubility is less than 10%. Thus, the effect of the process is more dramatic on the B1 Ore Primary Cyclone O/F sample.

It is evident from these data that the process of the present invention may be used as an alternative for secondary recovery of $P_2O_5$ while minimizing $Fe_2O_3$.

Example 8

Effect of Iron Content in the Phosphate Rock on Phosphate and Iron Solubilization A series of tests following a procedure similar to the one outlined in Example 1 are done to determine the effect of the process on different KAP ores and feeds containing varying amounts of iron. The following parameters are used:

| | |
|---|---|
| Temperature: | 65° C. |
| Time: | 1 minutes |
| Sulphuric acid | 50% excess |
| Liquid | 3rd filtrate from Phos Acid process |
| Particle size | <38 micron |
| rock:liquid | 1:15 |

Figure 4:
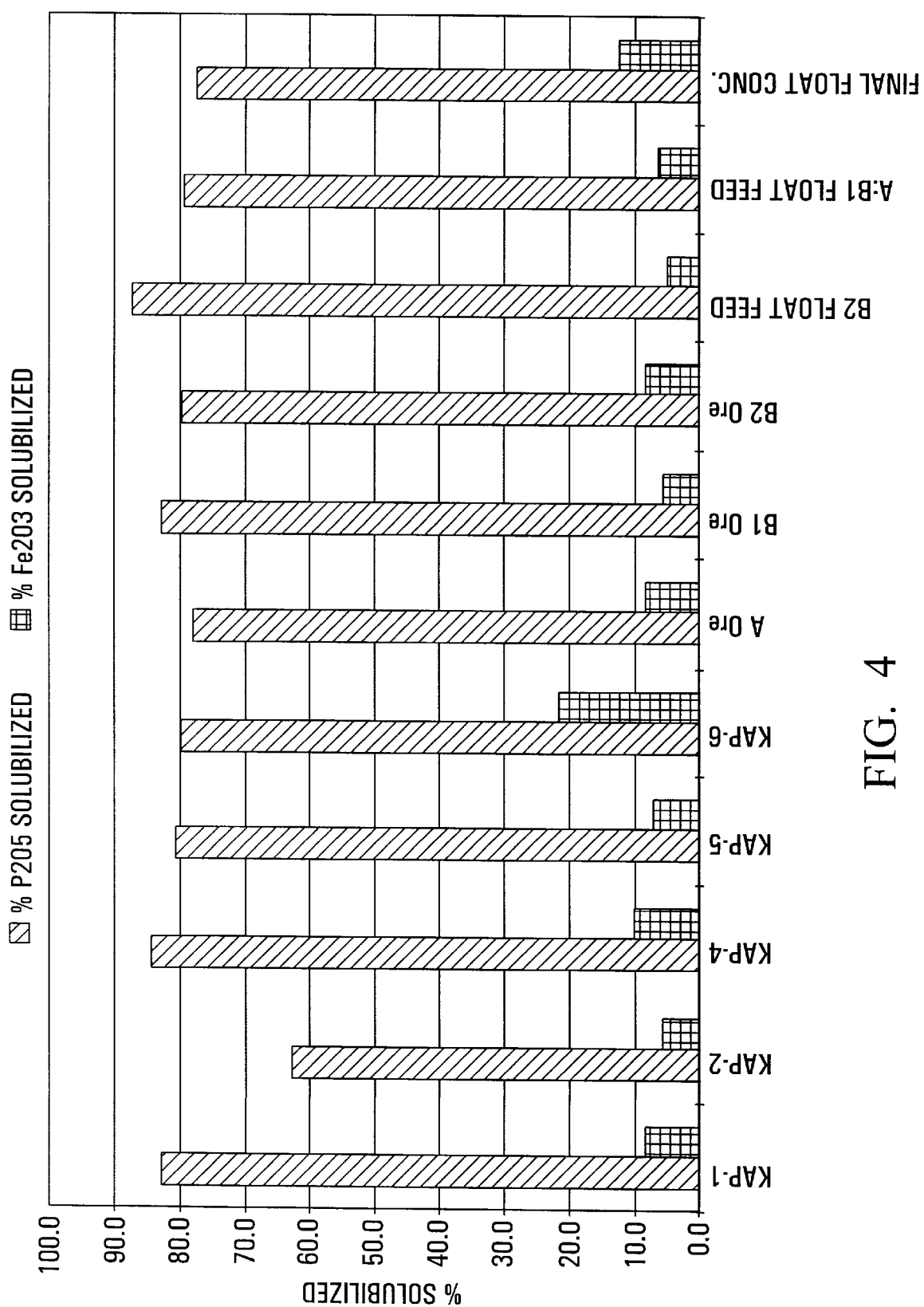
FIG. 4 is a graph depicting the percentage phosphate solubilized and the percentage iron solubilized in the leaching of phosphate rock having different iron contents.

FIG. 4 shows the percentage of phosphate solubilized and the percentage of iron solubilized from samples of KAP ore/feeds in a leach process with the above-noted parameters. Table 6 summarizes the initial amount of phosphorus and iron in each of the samples of this Example and in FIG. 4.

TABLE 6

| Type of KAP ore/feed | % P₂O₅ in ore/feed | % Fe₂O₃ in ore/feed |
|---|---|---|
| KAP-1 | 30.4 | 2.2 |
| KAP-2 | 11.3 | 61.7 |
| KAP-4 | 12.5 | 11.4 |
| KAP-5 | 10.2 | 21.4 |
| KAP-6 | 4.8 | 6.3 |
| A Ore | 30.6 | 4.4 |
| B1 Ore | 20.4 | 35.3 |
| B2 Ore | 14.2 | 36.6 |
| B2 float feed | 14.7 | 58.8 |
| A:B1 float feed | 33.4 | 9.7 |
| Final float concentrate | 36.5 | 5.8 |

It is apparent from the results shown in FIG. 4 and Table 6 that the difference in % P and % Fe solubilized, at a significantly small particle size, exists over a wider range of P and Fe contents in phosphate rock. Therefore, the separation of phosphate from impurities is possible over a wide variety of phosphate rocks.

Example 9

Extent of Solubilization of Other Constituent Elements in the Phosphate Rock Tests following a procedure similar to the one outlined in Example 1 are done to determine the extent of solubilization of other constituent elements (impurities) in the phosphate rock. The following parameters are used:

|  | Test 1 | Test 2 |
|---|---|---|
| Particle size | <38 microns (−400 Tyler mesh) | <38 microns (−400 Tyler mesh) |
| Temperature | 30° C. | 70° C. |
| Time | 5 min. | 2 min. |
| Amt. of rock | 6 grams | 6 grams |
| Amt. of liquid | 40 gms (pondwater) | 40 gms (3rd filtrate) |
| Amt. of H₂SO₄ | 10 grams | 7.5 grams |

Test 1 is the same as Test #6 from Table 4 in Example 5. Test 2 is the same as the test run done on the B1 Ore Primary Cyclone O/F described in Example 7.

Figure 5A:
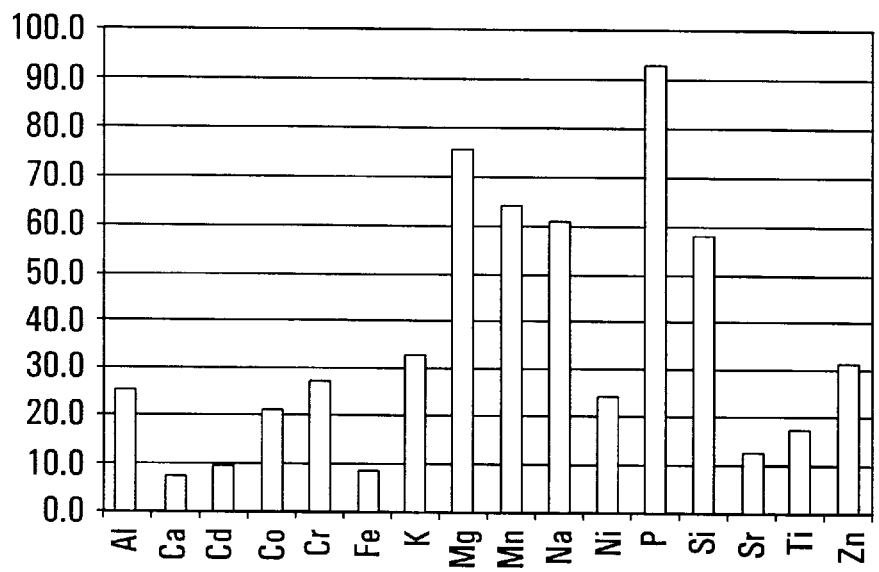
FIGS. 5A and 5B are graphs depicting the percentage of various constituent elements solubilized in a leaching of phosphate rock at different temperatures and times.
Figure 5B:
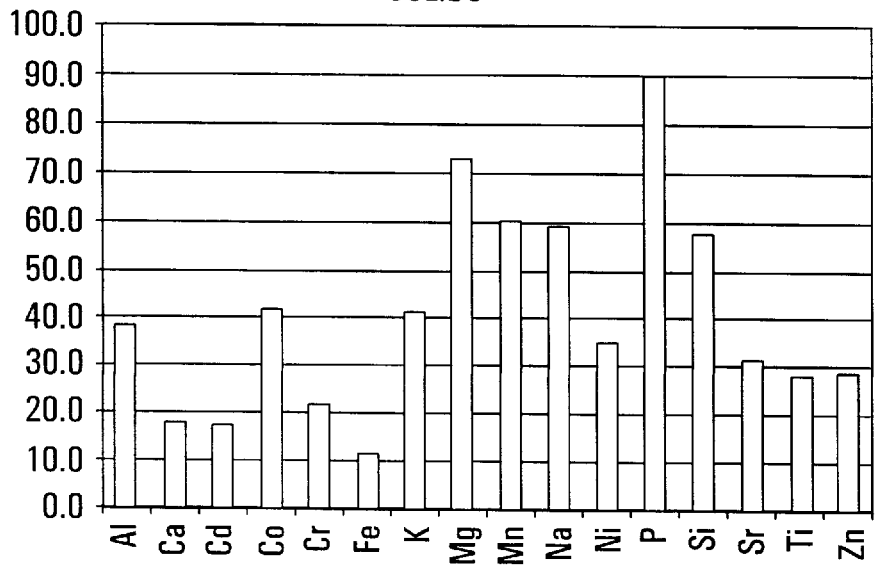

FIGS. 5A and 5B and Table 7A and 7B show the results of the tests. FIG. 5A and Table 7A relate to Test 1 and FIG. 5B and Table 7B relate to Test 2. It is evident from the results that dissolution of other impurities may be minimized while maintaining a high recovery of phosphate.

TABLE 7A

Test 1

|  | Amt. in rock (ppm) | Amt. in liquid (ppm) | Amt. in solids (ppm) | Amt. in leachate (ppm) | % not to solids | % to solids | % to leachate | Mass balance |
|---|---|---|---|---|---|---|---|---|
| Al | 6883 | 173.3 | 3615 | 76.12 | 25.9 | 74.1 | 19.7 | 93.7 |
| Ca | 334,200 | 770.3 | 227,800 | 826.6 | 6.7 | 93.3 | 6.5 | 99.8 |
| Cd | 9.44 | 3.72 | 6.22 | 0.77 | 9.8 | 90.2 | 2.7 | 92.9 |
| Co | 65.34 | 0.39 | 37.67 | 0.50 | 21.1 | 78.9 | 20.7 | 99.6 |
| Cr | 35.97 | 2.07 | 19.39 | 0.88 | 26.2 | 73.8 | 40.9 | 114.7 |
| Fe | 70,860 | 181.3 | 47,650 | 211.5 | 7.9 | 92.1 | 8.0 | 100.0 |
| K | 269.8 | 58.99 | 131.2 | 16.73 | 33.4 | 66.6 | 55.4 | 121.9 |
| Mg | 2704 | 131.7 | 485.8 | 91.08 | 75.4 | 24.6 | 76.8 | 101.4 |
| Mn | 1171 | 15.68 | 307.6 | 25.99 | 64.0 | 36.0 | 63.1 | 99.0 |
| Na | 1819 | 622.5 | 527.9 | 183.4 | 60.3 | 39.7 | 98.9 | 138.6 |
| Ni | 15.74 | 1.14 | 8.69 | 0.31 | 24.4 | 75.6 | 15.6 | 91.2 |
| P | 143,406 | 3873 | 8248 | 4849 | 92.1 | 7.9 | 91.7 | 99.5 |
| Si | 5937 | 166.8 | 1876 | 571.6 | 56.7 | 43.3 | 293.5 | 336.8 |
| Sr | 3407 | 23.19 | 2158 | 17.55 | 13.3 | 86.7 | 12.2 | 98.9 |
| Ti | 1350 | 3.634 | 813.8 | 2.677 | 17.5 | 82.5 | 4.6 | 87.2 |
| Zn | 200.7 | 8.836 | 100.8 | 3.711 | 31.2 | 68.8 | 30.6 | 99.4 |
| Fe/P | 0.494 | 0.047 | 5.777 | 0.044 |  |  |  |  |

TABLE 7B

Test 2

|  | Amt. in rock (ppm) | Amt. in liquid (ppm) | Amt. in solids (ppm) | Amt. in leachate (ppm) | % not to solids | % to solids | % to leachate | Mass balance |
|---|---|---|---|---|---|---|---|---|
| Al | 13,230 | 190.2 | 7251 | 130.8 | 37.5 | 62.5 | 19.4 | 82.0 |
| Ca | 218,500 | 1205 | 157,500 | 1610 | 17.8 | 82.2 | 18.0 | 100.2 |
| Cd | 18.37 | 3.77 | 13.35 | 0.94 | 17.1 | 82.9 | 13.4 | 96.3 |
| Co | 141.40 | 0.58 | 71.11 | 2.20 | 42.6 | 57.4 | 42.9 | 100.3 |
| Cr | 63.65 | 2.92 | 42.80 | 1.45 | 23.3 | 76.7 | 36.2 | 112.9 |
| Fe | 209,100 | 490.8 | 161,300 | 897.7 | 12.0 | 88.0 | 11.0 | 99.1 |
| K | 383.1 | 54.32 | 194.8 | 17.87 | 42.0 | 58.0 | 42.5 | 100.5 |
| Mg | 2000 | 133.5 | 472.3 | 78.34 | 73.1 | 26.9 | 70.5 | 97.5 |
| Mn | 3076 | 23.08 | 1069 | 65.93 | 60.3 | 39.7 | 57.9 | 97.6 |

TABLE 7B-continued

Test 2

|     | Amt. in rock (ppm) | Amt. in liquid (ppm) | Amt. in solids (ppm) | Amt. in leachate (ppm) | % not to solids | % to solids | % to leachate | Mass balance |
| --- | --- | --- | --- | --- | --- | --- | --- | --- |
| Na  | 845.4  | 651.8 | 309    | 163.1  | 58.3 | 41.7 | 52.6 | 94.3 |
| Ni  | 46.14  | 1.29  | 26.70  | 0.79   | 34.0 | 66.0 | 31.5 | 97.5 |
| P   | 94,840 | 5860  | 8261   | 4123   | 90.1 | 9.9  | 86.5 | 96.4 |
| Si  | 12,680 | 285.3 | 4834   | 231    | 56.5 | 43.5 | 38.5 | 82.0 |
| Sr  | 2470   | 31.86 | 1512   | 31.51  | 30.2 | 69.8 | 28.9 | 98.7 |
| Ti  | 4622   | 11.56 | 2949   | 5.908  | 27.2 | 72.8 | 2.1  | 74.9 |
| Zn  | 435    | 12.61 | 274.9  | 6.769  | 27.9 | 72.1 | 26.4 | 98.5 |
| Fe/P | 2.205 | 0.084 | 19.525 | 0.218  |      |      |      |      |

Example 10

Effect of the Process on Filterability of Residue

A test is conducted to determine the filterability of solids formed during a process of the invention in comparison to a prior art process.

| Test A: | Filter time (sec) | Filtrate obtained (gms) |
| --- | --- | --- |
| Prior art process | | |
| 1511 gms attack slurry at 75° C. filtered at 21" Hg vacuum | 14.0 | 493 |
| 1st wash, 691 gms 3rd filtrate | 33.7 | 821 |
| 2nd wash, 704 gms 4th filtrate | 27.5 | 708 |
| 3rd wash, 703 gms cakewash water | 28.8 | 714 |
| 820 gms phosphogypsum obtained | | |
| Process of the invention | | |
| 1498 gms of leach slurry prepared (70° C., 2 min) and filtered | 13.5 | 555 |
| 1st wash, 691 gms 3rd filtrate | 29.8 | 699 |
| 2nd wash, 677 gms 4th filtrate | 24.4 | 668 |
| 3rd wash, 682 gms cakewash water | 30.0 | 724 |
| 732 gms phosphogypsum obtained | | |

Suspended solids content for Test A:

|  |  |
| --- | --- |
| Prior art, product acid | 13% v/v |
| Prior art, recycle acid | 1.5% v/v |
| Invention, product acid | 3% v/v |
| Invention, recycle acid | 1% v/v |

The results of Test A indicate that the solid residue formed in the process of the invention have acceptable filtration and dewatering rates that are at least as good as those of the prior art process. It is also evident that less solids pass through the filter cloth in a process of the invention in comparison to the prior art process. Therefore, isolation of the leachate of a process of the invention can be done via filtration.

Such good filterability characteristics are obtainable using the process of this invention despite the shorter reaction times used in this invention as opposed to the prior art. It has commonly been thought that longer reaction times are necessary for good crystal growth in order to achieve good filterability. The present invention surprisingly provides good filterability even though the reaction time is shorter.

Example 11

Industrial Application

1. Integration into existing Prayon process

Figure 6A:
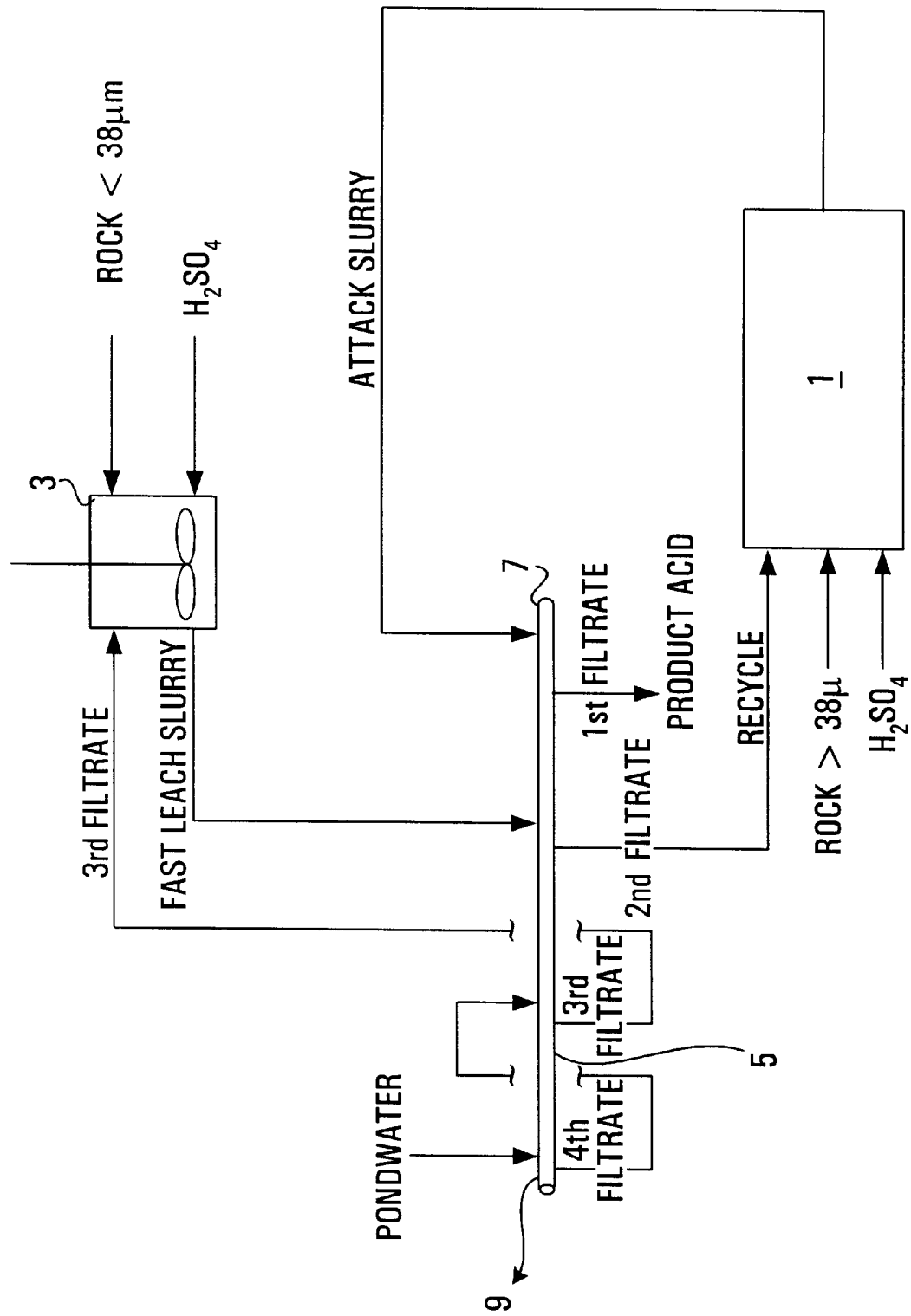
FIG. 6A is a schematic representation of how the present invention may be integrated into existing Prayon process.

With reference to FIG. 6A, phosphate rock concentrate from a beneficiation mill is screened into <38 micron and >38 micron fractions. Typically, 20% of the mass is in the <38 micron fraction, which also contains ~50% of the iron by weight.

The >38 micron fraction is fed through existing equipment into the existing attack tank (1). The <38 micron fraction is fed into the new fast leach reactor (3), designed for optimum temperature/time conditions according to maximize P and minimize Fe solubilization in accordance with the present invention. Also into the fast leach reactor (3) is fed $3^{rd}$ filtrate, from the existing vacuum belt filter (5), and sulphuric acid. An excess of sulphuric acid can be used to provide optimum fast leach conditions, since the excess returns to the attack tank (1) where extra sulphuric acid is required. The fast leach slurry is immediately fed onto the existing belt filter (5), just downstream of the existing attack slurry feed section (7). All of the fast leach filtrate returns to the attack tank (1) as recycle, while the fast leach solids go with the gypsum cake (9). Pondwater, which eventually ends up as $3^{rd}$ filtrate, is used to counter-current wash the gypsum cake to reduce water soluble phosphate losses. Gypsum cake (9) is sent to the gypsum stack for storage.

2. "Stand-alone" process

Figure 6B:
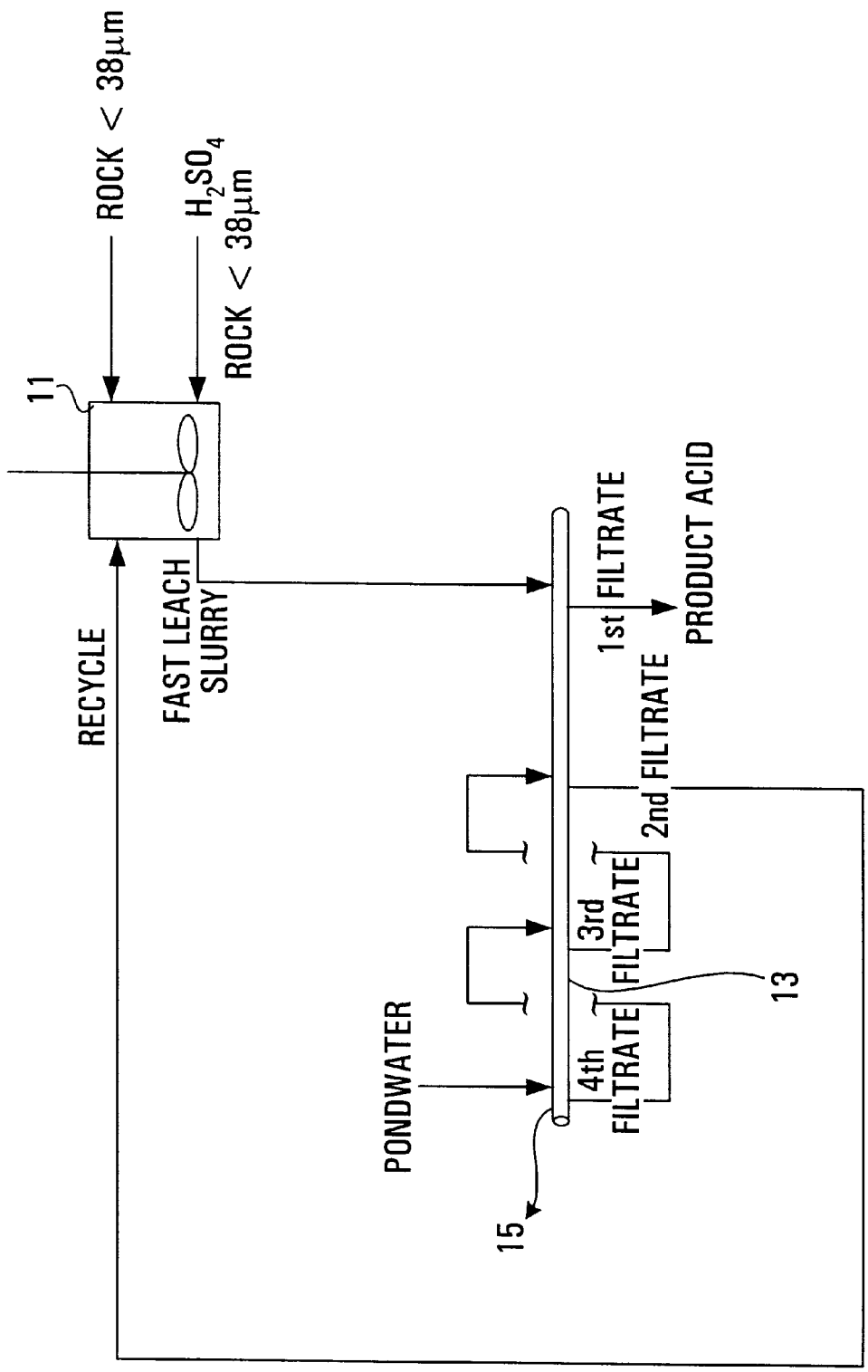
FIG. 6B is a schematic representation of how the present invention may be used as a "stand-alone" industrial process.

With reference to FIG. 6B, phosphate rock concentrate is first ground to <38 micron by any suitable means. The resulting finely divided phosphate rock is fed into a fast leach reactor (11), where it is intimately mixed with recycle ($2^{nd}$ filtrate), from a vacuum belt filter (13), and a stoichiometric amount of sulphuric acid (based on the amount of CaO in the phosphate rock). The fast leach reactor (11) is designed to provide optimum temperature/time conditions to maximize P and minimize Fe solubilization in a manner according to the present invention. The fast leach slurry is immediately fed onto the belt filter (13) where filtration and counter-current washes are carried out in a manner similar to the existing Prayon process. Gypsum cake (15) produced in this process is sent to the gypsum stack for storage.

3. Use of a rock slurry tank in a fast leach process

Figure 6C:
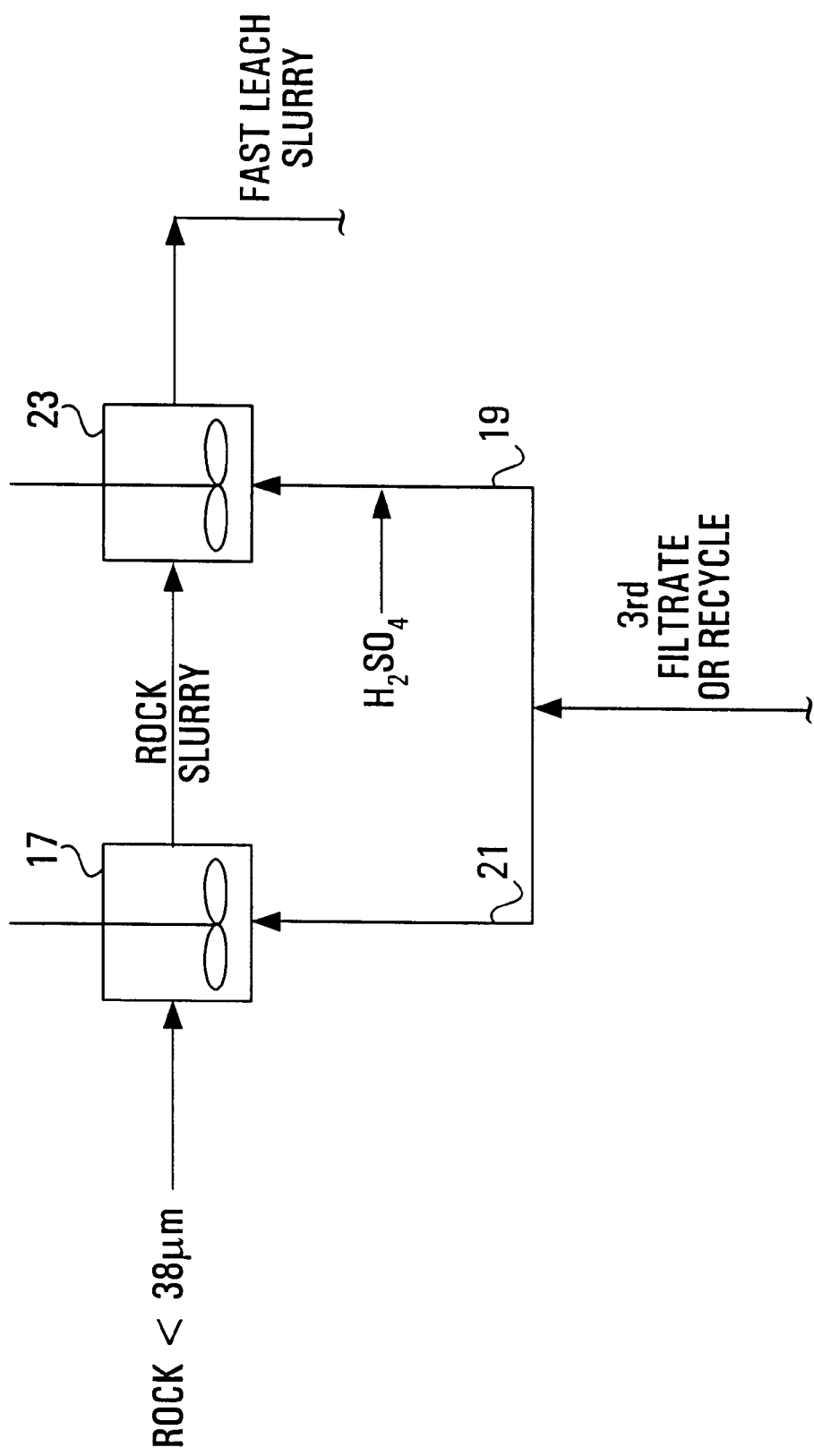
FIG. 6C is a schematic representation of the use of a rock slurry tank in a fast leach process of this invention.

FIG. 6C illustrates how a rock slurry tank (17) can be used in either the integrated Prayon process depicted in FIG. 6A or the "stand-alone" process depicted in FIG. 6B. With reference to FIG. 6C, $3^{rd}$ filtrate (integrated Prayon process) or recycle ("stand-alone" process) is divided into two streams—one stream (19) entering a fast leach reactor (23) and the other stream (21) entering a rock slurry tank (17). Finely ground phosphate concentrate is fed into the rock slurry tank (17), rather than the fast leach reactor, where it is mixed with the 3$^{rd}$ filtrate (integrated Prayon process) or the recycle ("stand-alone" process). Rock slurry produced in the rock slurry tank (17) is then fed into the fast leach reactor (23). Sulphuric acid is fed into stream (19) at a point before the stream enters the fast leach reactor (23). The other elements of the integrated Prayon process (FIG. 6A) or "stand-alone" process (FIG. 6B) remain the same. The adaptation depicted in FIG. 6C may provide for even better recovery of phosphate and removal of impurities in a process of this invention.

The disclosures of all of the references mentioned hereinabove are hereby incorporated by reference in their entirety.

What is claimed is:

1. A process for selective solubilization of phosphate in relation to an impurity other than calcium in phosphate rock comprising:
   (a) leaching finely divided particles of phosphate rock with a protic acid at a temperature and for a time that favours solubilization, into a leachate, of phosphate in relation to the impurity; and,
   (b) isolating the leachate from the impurity that is not solubilized; wherein:
   the finely divided particles of phosphate rock predominantly have a diameter of less than 200 microns;
   the temperature is between about −15° C. and about 150° C.;
   the time is between about 1 second to about 24 hours; and
   the time has a relationship to the temperature of substantially inverse correspondence.

2. The process of claim 1, wherein the diameter is less than about 150 microns.
3. The process of claim 1, wherein the diameter is less than about 75 microns.
4. The process of claim 1, wherein the diameter is less than about 60 microns.
5. The process of claim 1, wherein the diameter is less than about 50 microns.
6. The process of claim 1, wherein the diameter is less than about 40 microns.
7. The process of claim 1, wherein the diameter is less than about 38 microns.
8. The process of claim 1, wherein the temperature and the time are essentially consistent with the following relationship:

$$\% P = -7.025 \ln(T)\ln(t) + 30.796 \ln(t) + 44.325 \ln(T) - 97.914$$

wherein % P is amount of phosphate solubilized expressed as a percentage of total phosphate that was present in the phosphate rock originally, T is the temperature in degrees Celsius, and t is the time in seconds.

9. The process of claim 8, wherein the temperature is from about 40° C. to about 70° C. and the time is from about 60 seconds to about 600 seconds.
10. The process of claim 1, wherein the temperature is from about 4° C. to about 80° C.
11. The process of claim 1, wherein the temperature is from about 10° C. to about 70° C.
12. The process of claim 1, wherein the temperature is from about 20° C. to about 70° C.
13. The process of claim 1, wherein the temperature is from about 40° C. to about 70° C.
14. The process of claim 1, wherein the temperature is from about 60° C. to about 70° C.
15. The process of claim 1, wherein the time is from about 5 seconds to about 20 minutes.
16. The process of claim 1, wherein the time is from about 30 seconds to about 10 minutes.
17. The process of claim 1, wherein the time is from about 1 minute to about 5 minutes.
18. The process of claim 1, wherein the time is from about 1 minute to about 3 minutes.
19. The process of claim 1, wherein the protic acid is sulphuric acid or nitric acid.
20. The process of claim 1, wherein the protic acid is sulphuric acid.
21. The process of claim 1, wherein the impurity is a transition metal or a main group metal or metalloid.
22. The process of claim 1, wherein the impurity is iron.
23. The process of claim 22, wherein the phosphate rock has an iron content greater than about 1% by weight based on the total weight of the phosphate rock.
24. The process of claim 23, wherein the iron content is greater than about 5% by weight based on the total weight of the phosphate rock.
25. The process of claim 1, wherein the leachate contains a ratio of impurity to phosphate which is smaller than that of the phosphate rock by at least 50%.
26. A process for selective solubilization of phosphate in relation to an impurity other than calcium in phosphate rock comprising:
   (a) leaching finely divided particles of phosphate rock having a diameter of less than about 40 microns with sulphuric acid at a temperature from about 40° C. to about 70° C. for about 1 minute to about 5 minutes to favour solubilization, into a leachate, of phosphate in relation to the impurity; and,
   (b) isolating the leachate from the impurity that is not solubilized.
27. The process of claim 26, wherein the temperature is from about 60° C. to about 70° C.
28. The process of claim 27, wherein the impurity is iron.
29. The process of claim 28, wherein the phosphate rock has an iron content greater than about 1% by weight based on the total weight of the phosphate rock.
30. The process of claim 29, wherein the iron content is greater than about 5% by weight based on the total weight of the phosphate rock.
31. The process of claim 26, wherein the leachate contains a ratio of impurity to phosphate which is smaller than that of the phosphate rock by at least 50%.
32. A process for separating phosphate from an impurity other than calcium in phosphate rock comprising leaching finely divided particles of phosphate rock with a protic acid at a temperature and for a time that favours retention of the impurity in a solid residue in relation to retention of the phosphate in the solid residue; wherein:
   the finely divided particles of phosphate rock predominantly have a diameter of less than 200 microns;
   the temperature is between about −15° C. and about 150° C.;
   the time is between about 1 second to about 24 hours; and
   the time has a relationship to the temperature of substantially inverse correspondence.
33. The process of claim 32, wherein the diameter is less than about 150 microns.
34. The process of claim 32, wherein the diameter is less than about 75 microns.
35. The process of claim 32, wherein the diameter is less than about 60 microns.
36. The process of claim 32, wherein the diameter is less than about 50 microns.
37. The process of claim 32, wherein the diameter is less than about 40 microns.

38. The process of claim 32, wherein the diameter is less than about 38 microns.

39. The process of claim 32, wherein the temperature and the time are essentially consistent with the following relationship:

$$\% Fe = 0.001(T)(t) - 0.029(t) + 0.083(T) - 1.321$$

wherein % Fe is amount of iron solubilized expressed as a percentage of total iron that was present in the phosphate rock originally, T is the temperature in degrees Celsius, and t is the time in seconds.

40. The process of claim 39, wherein the temperature is from about 40° C. to about 70° C. and the time is from about 60 seconds to about 600 seconds.

41. The process of claim 32, wherein the temperature is from about 4° C. to about 80° C.

42. The process of claim 32, wherein the temperature is from about 10° C. to about 70° C.

43. The process of claim 32, wherein the temperature is from about 20° C. to about 70° C.

44. The process of claim 32, wherein the temperature is from about 40° C. to about 70° C.

45. The process of claim 32, wherein the temperature is from about 60° C. to about 70° C.

46. The process of claim 32, wherein the time is from about 5 seconds to about 20 minutes.

47. The process of claim 32, wherein the time is from about 30 seconds to about 10 minutes.

48. The process of claim 32, wherein the time is from about 1 minute to about 5 minutes.

49. The process of claim 32, wherein the time is from about 1 minute to about 3 minutes.

50. The process of claim 32, wherein the protic acid is sulphuric acid or nitric acid.

51. The process of claim 32, wherein the protic acid is sulphuric acid.

52. The process of claim 32, wherein the impurity is a transition metal or a main group metal or metalloid.

53. The process of claim 32, wherein the impurity is iron.

54. The process of claim 53, wherein the phosphate rock has an iron content greater than about 1% by weight based on the total weight of the phosphate rock.

55. The process of claim 54, wherein the iron content is greater than about 5% by weight based on the total weight of the phosphate rock.

56. The process of claim 32, wherein the solid residue contains a ratio of phosphorus to impurity which is reduced in relation to the phosphate rock.

57. A process for separating phosphate from an impurity other than calcium in phosphate rock comprising leaching finely divided particles of phosphate rock having a diameter of less than about 40 microns with a protic acid at a temperature from about 40° C. to about 70° C. for about 1 minute to about 5 minutes to favour retention of the impurity in a solid residue in relation to retention of the phosphate in the solid residue.

58. The process of claim 57, wherein the temperature is from about 60° C. to about 70° C.

59. The process of claim 57, wherein the impurity is iron.

60. The process of claim 59, wherein the phosphate rock has an iron content greater than about 1% by weight based on the total weight of the phosphate rock.

61. The process of claim 60, wherein the iron content is greater than about 5% by weight based on the total weight of the phosphate rock.

62. A process for selective recovery of phosphate in relation to an impurity in phosphate rock comprising:

(a) separating phosphate rock into a first fraction and a second fraction wherein the first fraction consists essentially of particles of phosphate rock, predominantly having a particle size of less than 200 microns and the second fraction consists essentially of particles of phosphate rock predominantly having a particle size of greater than 200 microns;

(b) leaching the particles of the first fraction with a protic acid at a temperature and for a time that favours solubilization into a first leachate of phosphate in relation to the impurity and that favours retention of the impurity in a first solid residue in relation to retention of phosphate in the first solid residue, wherein the temperature is between about −15° C. and about 150° C., the time is between about 1 second to about 24 hours, and the time has a relationship to the temperature of substantially inverse correspondence;

(c) digesting the particles of the second fraction with a protic acid to form a second leachate containing phosphate and a second solid residue;

(d) separating the first leachate from the first solid residue and separating the second leachate from the second solid residue; and (e) combining the first and second leachate.

* * * * *

UNITED STATES PATENT AND TRADEMARK OFFICE
CERTIFICATE OF CORRECTION

PATENT NO. : 6,562,308 B1
DATED : May 13, 2003
INVENTOR(S) : Leslie L. Carstens et al.

It is certified that error appears in the above-identified patent and that said Letters Patent is hereby corrected as shown below:

Column 2,
Line 31, the open bracket before "larger" should be deleted.

Column 8,
Line 63, the word "phosphate" should be deleted and replaced with -- iron --; the word "also" should appear on the same line between the words "is" and "favoured".

Beneath columns 13 and 14, between Table 7A and Table 7B, the following sentence should appear: -- Si mass balance is poor due to the action of fluorine and the presence of acid insoluble quartz silica in the rock. --

Beneath columns 15 and 16, after the end of Table 7B-continued, the following sentence should appear: -- Ti mass balance is poor due to the presence of acid insoluble ilmenite ($FeTiO_4$). --

Column 20,
Line 24, the "," after "rock" should be deleted.

Signed and Sealed this

Third Day of February, 2004

JON W. DUDAS
*Acting Director of the United States Patent and Trademark Office*